(12) United States Patent
Hausler et al.

(10) Patent No.: US 9,097,045 B2
(45) Date of Patent: Aug. 4, 2015

(54) TAILGATE HINGE

(71) Applicant: Ford Global Technologies, LLC, Dearborn, MI (US)

(72) Inventors: Henry W. Hausler, Manchester, MI (US); Andrew Kammerzell, West Bloomfield, MI (US); John Comiez, Novi, MI (US); Daniel Clatterbuck, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/039,498

(22) Filed: Sep. 27, 2013

(65) Prior Publication Data
US 2015/0091322 A1   Apr. 2, 2015

(51) Int. Cl.
*B62D 33/033* (2006.01)
*E05D 3/02* (2006.01)
*B62D 33/027* (2006.01)

(52) U.S. Cl.
CPC .............. *E05D 3/02* (2013.01); *B62D 33/0273* (2013.01); *B62D 33/033* (2013.01)

(58) Field of Classification Search
CPC ..................................................... B62D 33/033
USPC ................. 296/146.11, 53, 57.1; 16/260, 267
See application file for complete search history.

(56) References Cited

U.S. PATENT DOCUMENTS

| | | | |
|---|---|---|---|
| 6,340,190 B1* | 1/2002 | Rosebrugh et al. | 296/26.11 |
| 6,550,838 B2 | 4/2003 | Bobbitt, III et al. | |
| 7,213,858 B2 | 5/2007 | Smith | |
| 7,644,973 B2 | 1/2010 | Carloni et al. | |
| 7,857,371 B2* | 12/2010 | Leitner | 296/26.11 |
| 2004/0227368 A1* | 11/2004 | Seksaria et al. | 296/26.1 |
| 2006/0214454 A1* | 9/2006 | Austin | 296/57.1 |
| 2013/0278004 A1* | 10/2013 | Sackett | 296/57.1 |

FOREIGN PATENT DOCUMENTS

FR    1562076 A  *  4/1969

OTHER PUBLICATIONS

Machine translation of FR1562076A, printed from the EPO website, Jun. 14, 2014.*

* cited by examiner

*Primary Examiner* — Jason S Morrow
(74) *Attorney, Agent, or Firm* — Raymond L. Coppiellie; Brooks Kushman P.C.

(57) ABSTRACT

A tailgate hinge is part of a tailgate assembly and is attached to the rear sill of a pick-up truck bed. The tailgate hinge includes a stationary hinge bracket and a pivotal hinge bracket that are connected by a hinge pin. The pivotal hinge bracket includes a detachment slot. The hinge pin has a pair of flats that permit the hinge pin to pass through the detachment slot when the tailgate is at a predetermined angular orientation.

13 Claims, 3 Drawing Sheets

TAILGATE HINGE

TECHNICAL FIELD

This disclosure relates to pick-up truck tailgate hinges that permit removal of the tailgate without the use of tools and that resist lateral movement.

BACKGROUND

Pick-up truck tailgates are used to close the rear opening of a pick-up truck cargo box. A popular feature for pick-up truck tailgates is the ability to remove the tailgate without requiring tools. In one current design, disclosed in U.S. Pat. No. 7,644,973 (the '973 patent) (assigned to the assignee of this patent application), a hinge for a tailgate is disclosed that is secured between the side of the tailgate and the D-pillar at the rear of the truck bed. The location of the hinge on the D-pillar creates a load path through a complex joint to the load carrying sill with the D-pillar only being supported at the base of the D-pillar. Side-to-side movement of the tailgate may be addressed by shimming the hinge but this tends to be a time consuming procedure. This design provides a low cost tailgate hinge that is easy to assemble and easy to remove.

An issue with the tailgate disclosed in the '973 patent is that free play between the D-pillars caused by excessive acceleration while turning or road load inputs could result in disengagement of the tailgate from the truck. In the '973 patent, an anti-chucking bracket and striker are proposed to reduce side-to-side movement of the tailgate. One disadvantage of the design proposed in the '973 patent is that the bracket and striker add weight to the vehicle. Another disadvantage is the cost of assembling the bracket and striker to the vehicle.

The above problems and other problems are addressed by this disclosure as summarized below.

SUMMARY

According to one aspect of this disclosure, a tailgate hinge is provided for a pick-up truck having a truck bed that includes a tailgate and a rear sill. The tailgate hinge comprises first and second hinge brackets and a hinge pin. The first hinge bracket is attached to the rear sill and includes a right flange and a left flange disposed parallel to the right flange. The right flange and left flange extend rearward from a base that is secured to the rear sill. The right flange defines a first hinge pin receiving opening and the left flange defines a second hinge pin receiving opening. The second hinge bracket is attached to the tailgate and includes a center flange that extends from the tailgate to be received between the pair of spaced flanges of the first hinge bracket. The second hinge bracket defines a detachment slot that extends from a central portion through to the outer edge of the center flange. The hinge pin is assembled to the first hinge pin receiving opening and the second hinge pin receiving opening. The second hinge bracket is assembled to the first hinge bracket with the center flange being inserted between the right flange and the left flange through the detachment slot. The hinge pin in the central opening pivotally connects the second hinge bracket to the first hinge bracket.

According to an additional aspect of this disclosure, the detachment slot extends vertically downwardly when the tailgate is oriented at a predetermined opening angle of tailgate. The predetermined opening angle may be approximately 30 degrees. The detachment slot is disposed at an angle extending rearward and downward from the hinge pin when the tailgate is closed and that extends forward and downward when the tailgate is open. In one embodiment, the center flange is confined between the right flange and the left flange.

According to another aspect of this disclosure, a tailgate assembly is provided for a pick-up truck that has a truck bed that includes a rear sill. The tailgate assembly comprises a tailgate, a stationary hinge bracket, a pivotal hinge bracket and a hinge pin. The stationary hinge bracket is attached to the rear sill and includes at least one stationary flange that extends rearward from a base that is secured to the rear sill. The stationary flange defines a hinge pin receiving opening. The pivotal hinge bracket is attached to the tailgate and includes a pivotal flange that defines a detachment slot that extends from a central portion of the pivotal flange through to the outer edge of the center flange. The hinge pin is assembled into the hinge pin receiving opening and the detachment slot to pivotally connect the second hinge bracket to the first hinge bracket.

According to other aspects of this disclosure as it relates to the tailgate assembly, the tailgate assembly may further comprise a pocket formed in a rear lower corner of the tailgate. The second hinge bracket is secured to the tailgate within the pocket. The stationary flange of the first hinge bracket extends into the pocket where the hinge pin connects the stationary flange to the pivotal flange.

One of the first hinge brackets, one of the second hinge brackets and one of the hinge pins may be provided on both a lower right side corner of the tailgate and a lower left side corner of the tailgate. The at least one stationary flange of each of the first hinge brackets may further comprise a first stationary flange and a second stationary flange. In one example, the first hinge bracket and second hinge bracket on one side of the tailgate are connected with a clearance of about 1 mm, and wherein the first hinge bracket and second hinge bracket on the other side of the tailgate are connected with a clearance of about 6 mm.

The at least one stationary flange of each of the first hinge brackets may further comprise a first stationary flange and a second stationary flange. The pivotal flange may be confined between the first stationary flange and a second stationary flange. The hinge pin may have a right side portion that is received in the first stationary flange and a left side portion that is received in the second stationary flange, and a central portion that is received in the pivotal flange. The central portion may have a reduced diameter between two diametrically opposed locations on the central portion that are perpendicular to a centerline of the detachment slot when the tailgate is detached from the pick-up truck.

The above aspects of this disclosure and other aspects will be described in greater detail in the following detailed description of the illustrated embodiment with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
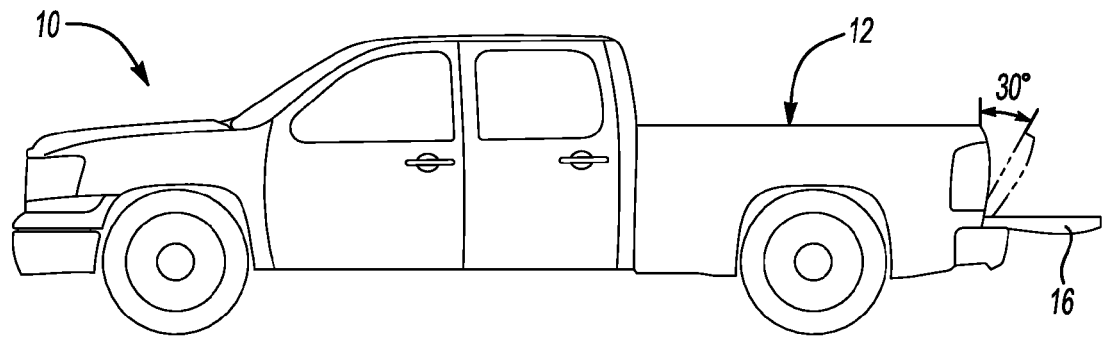
FIG. 1 is a side elevation view of a pick-up truck that has a removable tailgate.

Referring to FIG. 1, a pick-up truck 10 is shown to include a truck bed 12 that has a tailgate 16. As shown in FIG. 1, the tailgate 16 is shown in its open position extending substantially horizontally from the truck bed 12. The tailgate is shown in a detachable position in phantom lines with the tailgate oriented at approximately 30° from vertical in a position to be removed without the use of tools.

Figure 2:
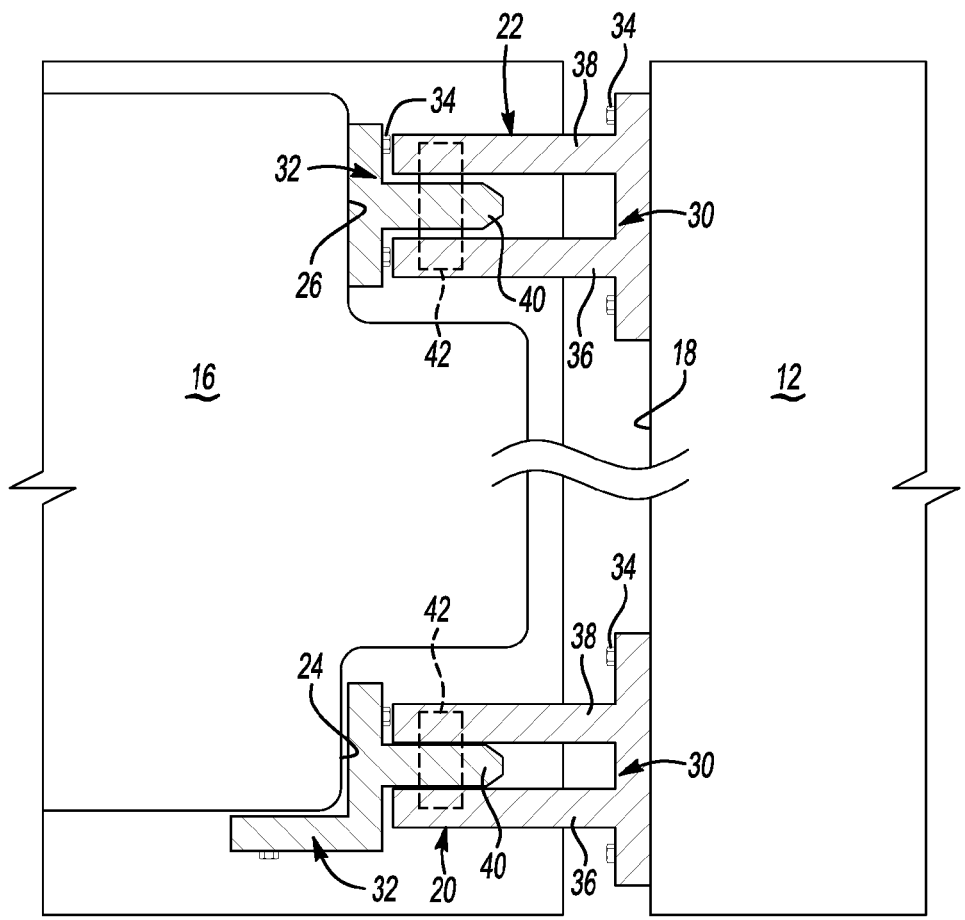
FIG. 2 is a fragmentary top plan view of a tailgate attached to the rear sill of a truck bed by a pair of hinges.

Referring to FIG. 2, the truck bed 12 is partially illustrated and includes a rear sill 18. Part of a tailgate 16 is shown with a right tailgate hinge 20 and left tailgate hinge 22 that connect the tailgate 16 to the truck bed 12. The tailgate 16 includes a right pocket 24 and a left pocket 26 that partially receive the right and left tailgate hinges 20 and 22.

Each of the tailgate hinges includes a stationary hinge bracket 30 and a pivotal hinge bracket 32. The stationary hinge bracket 30 is secured to the rear sill 18. The pivotal hinge bracket 32 is secured to the tailgate 16. The stationary hinge bracket 30 in the illustrated embodiment, includes a right flange 36 and a left flange 38. The pivotal hinge bracket 32 includes a center flange 40 that is assembled between the right flange 36 and left flange 38 of the stationary hinge bracket 30. A hinge pin 42 connects the right and left flanges 36 and 38 to the center flange 40. In an alternative embodiment, the stationary hinge bracket 30 may include a single flange, while the pivotal hinge bracket 32 may include two flanges.

Figure 3:
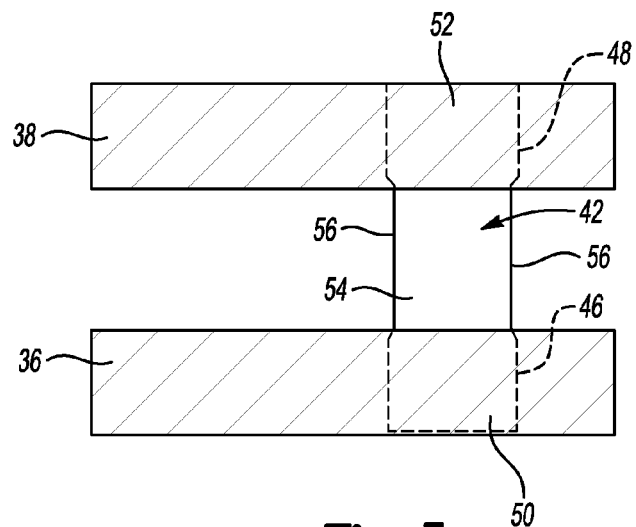
FIG. 3 is a diagrammatic cross-sectional plan view of a pair of flanges of a stationary hinge bracket and a hinge pin plan view.
Figure 4:
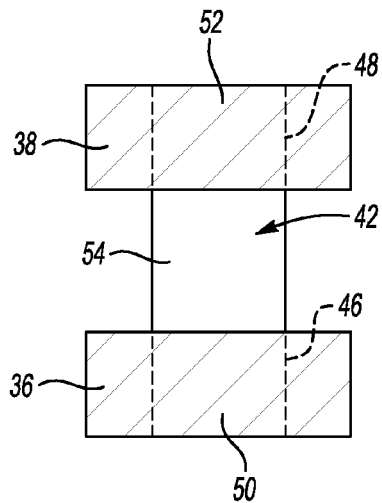
FIG. 4 is a diagrammatic cross-sectional rear elevation view of a pair of flanges of a stationary hinge bracket and a hinge pin.

Referring to FIGS. 3 and 4, the right flange 36 and left flange 38 are shown with the hinge pin 42. Hinge pin 42 is received in a first hinge pin receiving opening 46 formed in the right flange 36. A second hinge pin receiving opening 48 is formed in the left flange 38. A right side portion 50 of the hinge pin 42 is inserted into the first hinge pin receiving opening 46. A left side portion 52 of the hinge pin 42 is received in the second hinge pin receiving opening 48. A central portion 54 of the hinge pin 42 is generally cylindrical, but includes a pair of flats 56 that are disposed on diametrically opposed portions of the hinge pin 42. As shown in FIG. 3, the flats 56 have a reduced width compared to the right and left side portions 50 and 52 of the hinge pin 42. As shown in FIG. 4, the central portion 54 of the hinge pin 42 is shown to be of the same diameter as the right side portion 50 and left side 52 of the hinge pin 42.

Figure 5:
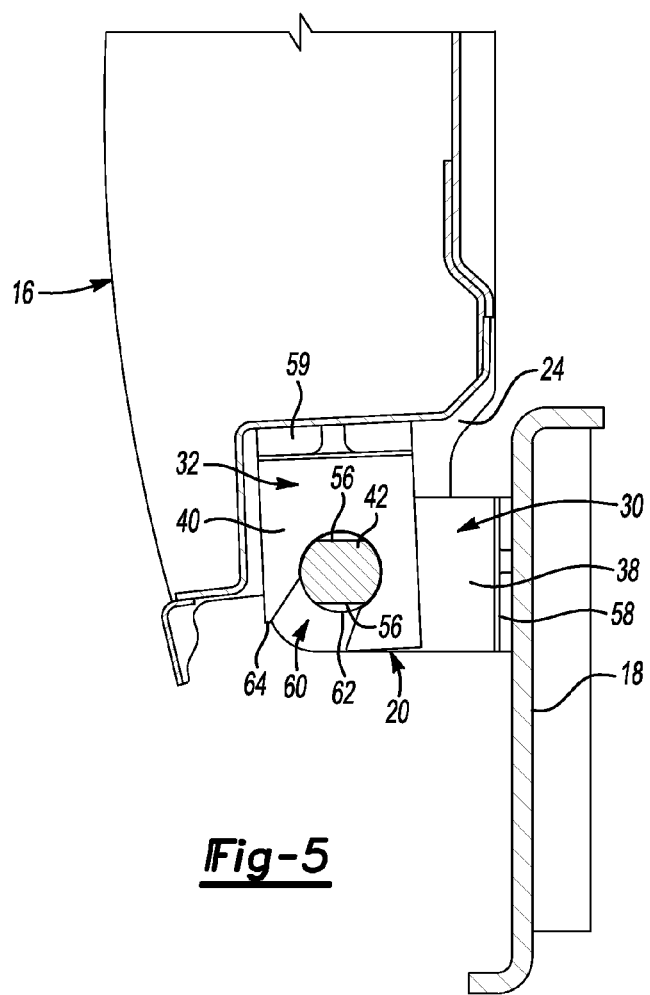
FIG. 5 is a fragmentary cross-sectional view of a tailgate and rear sill connected by a tailgate hinge in a closed position.

Referring to FIG. 5, the tailgate 16 is shown in its closed position where it extends vertically upwardly from the rear sill 18. The tailgate 16 is attached to the rear sill 18 by the right tailgate hinge 20. The right tailgate hinge 20 is shown disposed at least partially within the right pocket 24 formed in the tailgate 16. The stationary hinge bracket 30 is partially shown with the left flange 38 extending rearward from a base 58. The pivotal hinge bracket 32 is shown with the center flange 40 extending from a base 59 that is attached to a lower portion of the tailgate 16. The hinge pin 42 connects the center flange 40 to the left flange 38 and also the right flange 36 (shown in FIG. 2). The center flange 40 includes a detachment slot 60 that extends from a central portion 62 of the center flange 40 to an outer edge 64 of center flange 40. The flats 56 on the hinge pin 42 are not aligned with the detachment slot 60, as shown in FIG. 5, and the hinge pin 42 is prevented from passing through the detachment slot 60 when the tailgate 16 is in its vertical or closed position.

Figure 6:
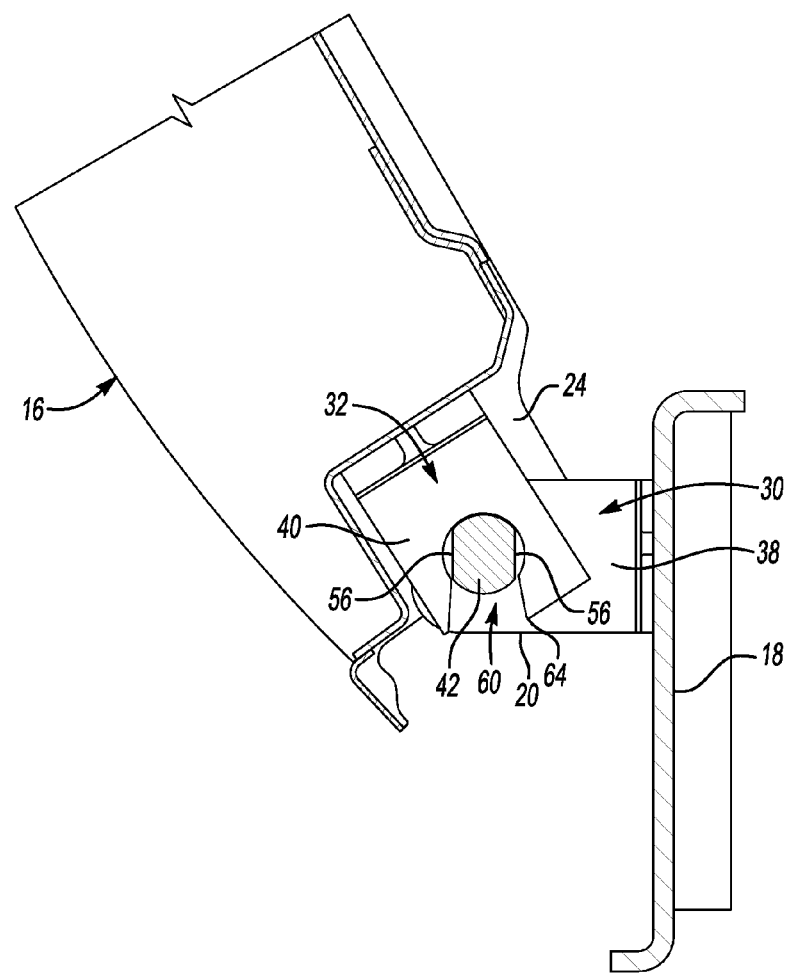
FIG. 6 is a fragmentary cross-sectional view of a tailgate and rear sill connected by a tailgate hinge in a detachable position.

Referring to FIG. 6, the tailgate 16 is shown to be opened to a predetermined angle (for example, 30° from vertical). At this orientation, the flats 56 of the hinge pin 42 are aligned with the detachment slot 60. The hinge pin 42 is permitted to pass through the detachment slot 60 when in alignment to remove the tailgate 16 from the rear sill 18 by simply lifting the tailgate 16 vertically upwardly until the hinge pin 42 passes through the detachment slot 60.

Figure 7:
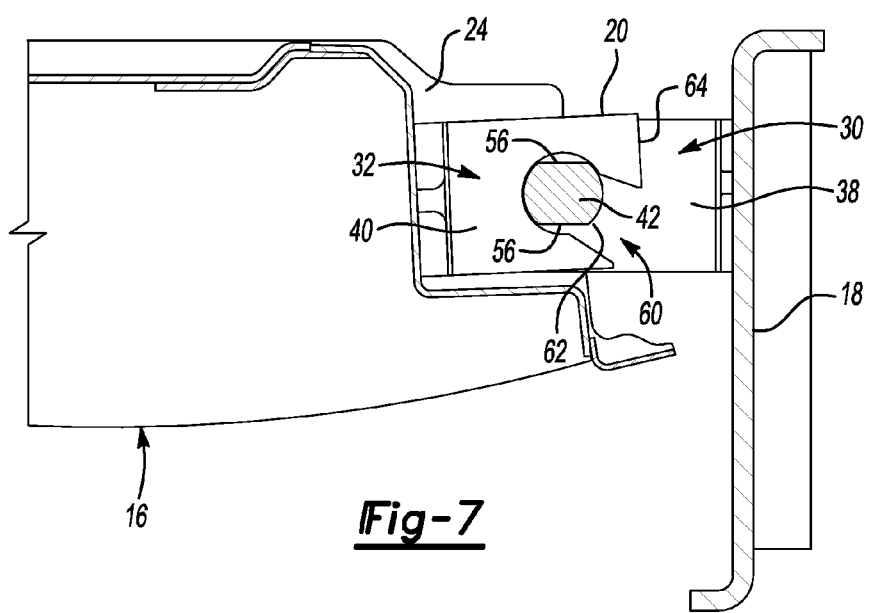
FIG. 7 is a fragmentary cross-sectional view of a tailgate and rear sill connected by a tailgate hinge in an open position.

Referring to FIG. 7, the tailgate 16 is shown extending horizontally rearward from the rear sill 18. In this position, the hinge pin 42 holds the stationary hinge bracket 30 and pivotal hinge bracket 32 together. The flats 56 on the hinge pin 42 are not aligned with detachment slot 60 to prevent the tailgate 16 from being removed in the horizontal or fully open position.

While exemplary embodiments are described above, it is not intended that these embodiments describe all possible forms of the disclosure. The words used in the specification are words of description rather than limitation. Changes may be made to the illustrated embodiments without departing from the spirit and scope of the disclosure as claimed. The features of the illustrated embodiments may be combined to form further embodiments of the disclosed concepts.

What is claimed is:

1. A tailgate hinge for a pick-up truck having a truck bed that includes a tailgate and a rear sill, the tailgate hinge comprising:

a first hinge bracket attached to the rear sill that includes a right flange and a left flange disposed parallel to and spaced from the right flange, the right flange and left flange extend rearward from a base that is secured to the rear sill, wherein the right flange defines a first hinge pin receiving opening and the left flange defines a second hinge pin receiving opening;

a second hinge bracket attached to the tailgate that includes a center flange that extends from the tailgate to be received between the right flange and the left flange of the first hinge bracket, wherein the second hinge bracket defines a detachment slot that extends from a central opening through to an outer edge of the center flange; and a hinge pin is assembled to the first hinge pin receiving opening and the second hinge pin receiving opening, wherein the second hinge bracket is assembled to the first hinge bracket with the center flange being inserted between the right flange and the left flange through the detachment slot and into the central opening pivotally connecting the second hinge bracket to the first hinge bracket, wherein the hinge pin has a central portion that is generally cylindrical and has at least one flat that provides a reduced width portion, wherein the central portion is wider than the detachment slot except where the at least one flat is aligned with the detachment slot.

2. The tailgate hinge of claim 1 wherein the detachment slot has a centerline that extends vertically downwardly when the tailgate is oriented at a predetermined angle of tailgate opening.

3. The tailgate hinge of claim 2 wherein the predetermined angle is 30 degrees open.

4. The tailgate hinge of claim 1 wherein the detachment slot has a back edge that is disposed at an angle extending rearward and downward from the hinge pin when the tailgate is closed and that extends forward and downward when the tailgate is open.

5. A tailgate assembly for a pick-up truck having a truck bed that includes a rear sill, the assembly comprising:
   a tailgate;
   a first hinge bracket that includes a first stationary flange and a second stationary flange;
   a second hinge bracket attached to the tailgate that includes a pivotal flange that defines a detachment slot that extends from a central portion of the pivotal flange through to an outer edge of the pivotal flange, wherein the pivotal flange is confined between the first stationary flange and the second stationary flange that extends rearward from the rear sill and, wherein the pivotal flange defines a hinge pin receiving opening; and
   a hinge pin assembled to the hinge pin receiving opening and the detachment slot to pivotally connect the second hinge bracket to the first hinge bracket, wherein the hinge pin has a right side portion received in the first stationary flange, a left side portion received in the second stationary flange, and a center portion received in the pivotal flange, and wherein the center portion has a reduced diameter between two diametrically opposed flats on the center portion that are perpendicular to the detachment slot when the tailgate is detached from the truck.

6. The tailgate assembly of claim 5 further comprising a pocket formed in a rear lower corner of the tailgate, wherein the second hinge bracket is secured to the tailgate within the pocket, and wherein the first and second stationary flanges of the first hinge bracket extend into the pocket where the hinge pin connects the stationary flanges to the pivotal flange.

7. The tailgate assembly of claim 5 further comprising a first hinge bracket, a second hinge bracket and a hinge pin being provided on both a lower right side corner of the tailgate and a lower left side corner of the tailgate.

8. The tailgate assembly of claim 7 wherein the the first hinge bracket and second hinge bracket on a first side of the tailgate are connected with a first clearance of about 1 mm, and wherein the first hinge bracket and second hinge bracket on a second side of the tailgate are connected with a second clearance of about 6 mm.

9. The tailgate assembly of claim 5 wherein the detachment slot extends vertically downwardly when the tailgate is oriented at a predetermined angle of tailgate opening.

10. The tailgate assembly of claim 9 wherein the predetermined angle of tailgate opening is 30 degrees.

11. The tailgate assembly of claim 5 wherein the detachment slot has a back edge that is disposed at an angle extending rearward and downward from the hinge pin when the tailgate is closed and that extends forward and downward when the tailgate is open.

12. A hinge assembly for connecting a tailgate to a truck comprising:
   a first bracket having first and second flanges defining first and second hinge-pin openings;
   a second bracket having a central flange that defines a detachment slot and a central opening;
   a hinge-pin connecting the first bracket to the second bracket for pivotally connecting the tailgate to the truck; and
   means for detaching the first bracket from the second bracket.

13. The hinge assembly of claim 12 wherein includes a flat that reduces the width of the hinge-pin to fit within the detachment slot.

\* \* \* \* \*